US011568337B2

(12) United States Patent
Nandi et al.

(10) Patent No.: US 11,568,337 B2
(45) Date of Patent: Jan. 31, 2023

(54) IDENTIFYING TASK ASSIGNMENTS

(71) Applicant: Microsoft Technology Licensing, LLC, Redmond, WA (US)

(72) Inventors: Ajoy Nandi, Redmond, WA (US); Jason T. Creighton, Bellevue, WA (US); Nikrouz Ghotbi, Redmond, WA (US); Ryen W. White, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1641 days.

(21) Appl. No.: 15/192,434

(22) Filed: Jun. 24, 2016

(65) Prior Publication Data
US 2017/0372253 A1    Dec. 28, 2017

(51) Int. Cl.
G06Q 10/06    (2012.01)
G06Q 10/10    (2012.01)
G10L 15/26    (2006.01)
G10L 25/57    (2013.01)
H04L 51/18    (2022.01)

(52) U.S. Cl.
CPC ..... *G06Q 10/063114* (2013.01); *G06Q 10/06* (2013.01); *G06Q 10/063112* (2013.01); *G06Q 10/10* (2013.01); *G06Q 10/109* (2013.01); *G10L 15/26* (2013.01); *G10L 25/57* (2013.01); *H04L 51/18* (2013.01)

(58) Field of Classification Search
USPC ....................................................... 705/7.15
See application file for complete search history.

(56) References Cited

U.S. PATENT DOCUMENTS

| 5,208,748 | A | 5/1993 | Flores et al. | |
| 7,076,499 | B2* | 7/2006 | Powers | G06Q 10/10 |
| 7,945,470 | B1* | 5/2011 | Cohen | G06Q 10/06 |
| | | | | 705/7.13 |

(Continued)

FOREIGN PATENT DOCUMENTS

WO    2013003007 A2    1/2013

OTHER PUBLICATIONS

"International Search Report and Written Opinion Issued in PCT Application No. PCT/US2017/038403", dated Aug. 17, 2017, 10 Pages.

(Continued)

*Primary Examiner* — Alan Torrico-Lopez
(74) *Attorney, Agent, or Firm* — Shook, Hardy, Bacon L.L.P.

(57) ABSTRACT

Task assignments are identified. A dataset that includes one or more electronic messages is received. Then, one or more pending tasks in the dataset are identified, and each of a plurality of people who are mentioned in the dataset is also identified. Then, for each of the pending tasks, one or more of the identified people are identified as potentially being people who are assigned to complete the pending task, and the pending task is associated with these identified one or more of the identified people. For each of the pending tasks, one or more of the identified people are also identified as potentially being people for whom the pending task is to be completed, and the pending task is also associated with these identified one or more of the identified people.

20 Claims, 8 Drawing Sheets

(56) References Cited

U.S. PATENT DOCUMENTS

| | | |
|---|---|---|
| 8,103,726 B2 | 1/2012 | Stoddard et al. |
| 8,185,589 B2 | 5/2012 | Sundararajan et al. |
| 8,621,008 B2 | 12/2013 | Chebiyyam |
| 9,170,993 B2* | 10/2015 | Kalia ............... G06F 17/28 |
| 2004/0012638 A1 | 1/2004 | Donnelli et al. |
| 2005/0080657 A1* | 4/2005 | Crow ............ G06Q 10/063112 |
| | | 705/7.14 |
| 2006/0047558 A1* | 3/2006 | Uchiyama ............ G06Q 10/00 |
| | | 705/7.16 |
| 2012/0036197 A1 | 2/2012 | Bishop |
| 2012/0245925 A1 | 9/2012 | Guha et al. |
| 2013/0007648 A1* | 1/2013 | Gamon ............... G06Q 10/109 |
| | | 715/771 |
| 2013/0232263 A1 | 9/2013 | Kelly et al. |
| 2014/0122143 A1* | 5/2014 | Fletcher ............ G06Q 10/0631 |
| | | 705/7.14 |
| 2015/0178371 A1* | 6/2015 | Seth ................... G06F 16/3322 |
| | | 707/748 |
| 2016/0292011 A1* | 10/2016 | Colson ................. G06F 9/5044 |
| 2017/0083668 A1* | 3/2017 | Surprenant ............ G06Q 10/06 |
| 2017/0140318 A1* | 5/2017 | Platakis ............. G06Q 10/0631 |
| 2017/0193349 A1* | 7/2017 | Jothilingam ........... G06N 3/006 |

OTHER PUBLICATIONS

Bradley, "Cortana Now Helps You Keep Promises You Make In Email", Jan. 25, 2016, pp. 2, retrieved at <<http://www.forbes.com/sites/tonybradley/2016/01/25/cortana-now-helps-you-keep-promises-you-make-in-email/#3363b4bb355c>>.

Carvalho, et al., "On the Collective Classification of Email "Speech Acts"", Proceedings of the 28th annual international Association for Computing Machinery (ACM) Special Interest Group on Information Retrieval (SIGIR) conference on Research and development in information retrieval (SIGIR '05), Aug. 15, 2005, pp. 8, ACM.

Lampert, et al., "Requests and Commitments in Email are More Complex Than You Think: Eight Reasons to be Cautious", Australasian Language Technology Association (ALTA) Workshop 2008: Proceedings of the Workshop (ALTA 2008), Dec. 8-10, 2008, pp. 9, ALTA.

* cited by examiner

IDENTIFYING TASK ASSIGNMENTS

BACKGROUND

The Internet is a global data communications system that serves billions of people across the globe and provides them access to a vast array of online information resources and services including those provided by the World Wide Web and intranet-based enterprises. Thanks to the ubiquity of the Internet and the wide variety of network-enabled end-user computing devices that exist today, people today spend a large and ever-increasing amount of time online. People today also heavily rely on electronic messages to communicate with each other in both a professional and a personal context. In other words, people today frequently have conversations by sending and receiving electronic messages over a data communication network.

Successful communication between people is paramount to their well-being and success. For example, successful communication between the members of an organization and its clients is paramount to the well-being and success of the organization as well as its members and clients. In the course of such communication tasks are often assigned to people. Failure to appropriately complete the assigned tasks in a timely fashion can negatively impact the well-being of the people who were assigned to complete the tasks as well as the people for whom the tasks are being completed. In the case where these people are members of an organization, failure to complete the assigned tasks may also negatively impact the well-being of the organization and its clients. This also applies to people's personal lives and their communication with family and friends.

SUMMARY

Task assignment identification technique implementations described herein generally involve identifying task assignments. In one exemplary implementation a dataset that includes one or more electronic messages is received. Then, one or more pending tasks in the dataset are identified, and each of a plurality of people who are mentioned in the dataset is also identified. Then, for each of the pending tasks, ones of the identified people are identified as potentially being people who are assigned to complete the pending task, and the pending task is associated with these identified ones of the identified people.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the task assignment identification technique implementations described herein will become better understood with regard to the following description, appended claims, and accompanying drawings where:

DETAILED DESCRIPTION

Figure 1:
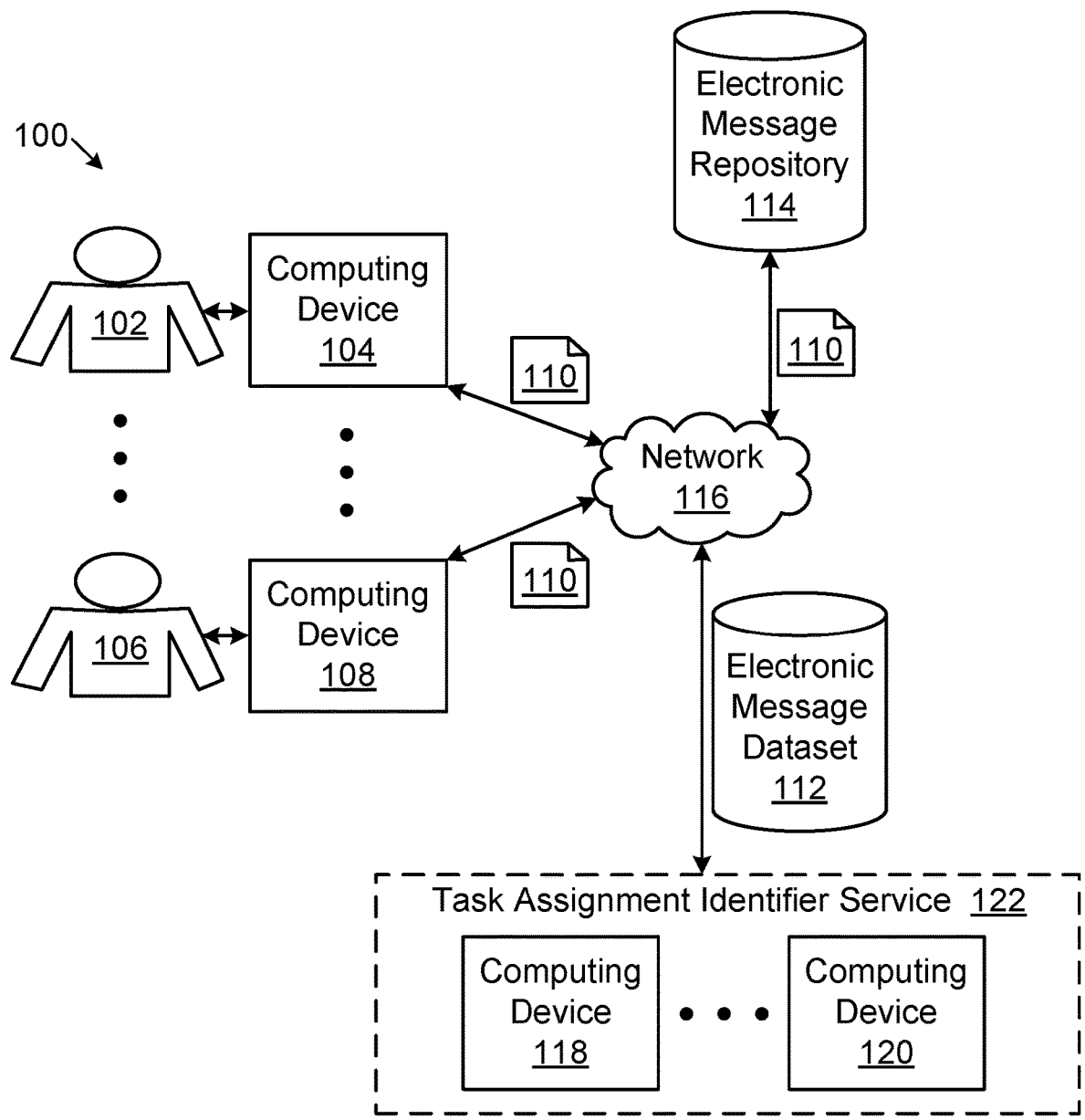
FIG. 1 is a diagram illustrating an exemplary implementation, in simplified form, of a system framework for realizing the task assignment identification technique implementations described herein.

In the following description of task assignment identification technique implementations reference is made to the accompanying drawings which form a part hereof, and in which are shown, by way of illustration, specific implementations in which the task assignment identification technique can be practiced. It is understood that other implementations can be utilized and structural changes can be made without departing from the scope of the task assignment identification technique implementations.

It is also noted that for the sake of clarity specific terminology will be resorted to in describing the task assignment identification technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the task assignment identification technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the task assignment identification technique does not inherently indicate any particular order nor imply any limitations of the task assignment identification technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Electronic Messaging

As described heretofore, people today heavily rely on electronic messages to communicate with each other in both a professional and a personal context. In the course of this communication tasks are often assigned to people. As is appreciated in the art of electronic messaging over data communication networks, people today routinely exchange various types of electronic messages with each other including, but not limited to, email (also known as electronic mail and e-mail) messages, instant text messages (also known as SMS (Short Message Service) messages), instant multimedia messages (also known as MMS (Multimedia Messaging Service) messages), recorded voice messages (e.g., recorded phone calls and the like), recorded video messages (e.g., recorded video calls and the like), blog postings on the World Wide Web (hereafter simply referred to as the web), user postings on social networking websites, and fax (also known as facsimile or telefax) messages.

2.0 Identifying Task Assignments

The task assignment identification technique implementations described herein generally involve identifying task assignments. More particularly and as will be appreciated from the more-detailed description that follows, the task assignment identification technique implementations automatically identify pending (e.g., not yet completed) tasks in a dataset of electronic messages, and also automatically identify each of the people who are mentioned (e.g., named, among other ways of mentioning a person) in this dataset. Then, for each of the pending tasks in the dataset, one or more of the identified people may be identified as potentially being people who are assigned to complete (e.g., are responsible for completing) the pending task, and the pending task may be associated with these identified one or more of the identified people. For each of the pending tasks in the dataset, one or more of the identified people may also be identified as potentially being people for whom the pending task is to be completed, and the pending task may also be associated with the one or more of the identified people that are identified as potentially being people for whom the pending task is to be completed.

The task assignment identification technique implementations described herein are advantageous for various reasons including, but not limited to, the following. As will be appreciated from the foregoing and the more-detailed description that follows, the task assignment identification technique implementations increase user efficiency and productivity since pending tasks are automatically identified and people are automatically associated with these tasks. As such, the task assignment identification technique implementations serve to optimize the well-being of people who communicate with each other using electronic messages. In the case where these people are members of an organization, the task assignment identification technique implementations may also serve to optimize the well-being of the organization and its clients. Additionally, the task assignment identification technique implementations can be employed in a wide variety of online services and computing applications. For example, the task assignment identification technique implementations can be employed in any type of web search service/application, any type of electronic messaging service/application, any type of calendaring or task tracking and management service/application, and any type of collaboration service/application.

FIG. 1 illustrates an exemplary implementation, in simplified form, of a system framework for realizing the task assignment identification technique implementations described herein. As exemplified in FIG. 1, the system framework 100 includes one or more end-user computing devices 104/108 each of which is utilized by one or more people 102/106 to communicate electronic messages 110 between themselves 102/106. Exemplary types of electronic messages 110 that may be communicated between the people 102/106 are described in more detail hereafter. Each of the end-user computing devices 104/108 can be any type of conventional mobile computing device such as a smartphone, or a tablet computer, or a laptop computer (sometimes also referred to as a notebook or netbook computer), among other types of conventional mobile computing devices. Each of the end-user computing devices 104/108 can also be any type of conventional non-mobile computing device such as a desktop personal computer (PC), or a video game console, among other types of conventional non-mobile computing devices.

Referring again to FIG. 1, each of the end-user computing devices 104/108 is configured to communicate over a conventional data communication network 116 (herein also referred to as a computer network) such as the Internet (among other types of conventional data communication networks) with an electronic message repository 114 that stores the electronic messages 110 which are communicated between the people 102/106. The task assignment identification technique implementations described herein support the communication of any type of electronic message 110 between the people 102/106. By way of example but not limitation, in one implementation of the task assignment identification technique described herein the electronic messages 110 that are communicated between the people 102/106 and stored in the repository 114 include one or more email (also known as electronic mail and e-mail) messages which may include one or more email threads. As is appreciated in the art of email messaging, an email thread is an email message that includes a chronologically-ordered concatenation of an original email message and each of the succeeding replies thereto. Accordingly, an email thread provides a chronologically-ordered record of an email-based conversation that takes place between a plurality of people. In another implementation the electronic messages 110 may include one or more instant text messages, or one or more instant multimedia messages. In another implementation the messages 110 may include one or more recorded voice messages that have been converted to text using a conventional speech-to-text (also known as voice-to-text) conversion method, or one or more recorded video messages having audio that has been converted to text using the speech-to-text conversion method. In another implementation the messages 110 may include one or more web-based (e.g., online) blog postings, or one or more user postings on one or more social networking websites. In another implementation the messages 110 may include one or more fax messages that have been converted to text using a conventional optical character recognition method. In another implementation the messages 110 may include any combination of the just-described different types of electronic messages.

Referring again to FIG. 1, the end-user computing devices 104/108 and electronic message repository 114 are also configured to communicate over the data communication network 116 with a task assignment identifier service 122 that runs on one or more other computing devices 118/120. These other computing devices 118/120 can also communicate with each other via the network 116. In an exemplary implementation of the task assignment identification technique described herein the other computing devices 118/120 are located in the cloud so that the identifier service 122 operates as a cloud service and the network 116 includes wide area network functionality. The term "cloud service" is used herein to refer to a web application that operates in the cloud and can be hosted on (e.g., deployed at) a plurality of data centers that can be located in different geographic regions (e.g., different regions of the world). As will be described in more detail hereafter, the identifier service 122 generally performs a variety of functions associated with the identification of task assignments. By way of example but not limitation, the identifier service 122 receives a dataset 112 from the repository 114 that includes one or more of the electronic messages 110 that are communicated between the people 102/106 and stored in the repository 114. The identifier service 122 then automatically identifies pending tasks in the dataset 112 and people who are mentioned in the dataset 112. Then, for each of these pending tasks, the identifier service 122 may automatically identify one or more of the identified people as potentially being people who are assigned to complete the pending task, and associate the pending task with these identified one or more of the identified people. For each of the pending tasks, the identifier service 122 may also identify one or more of the identified people as potentially being people for whom the pending task is to be completed, and associate the pending task with these one or more of the identified people that are identified as potentially being people for whom the pending task is to be completed.

Figure 2:
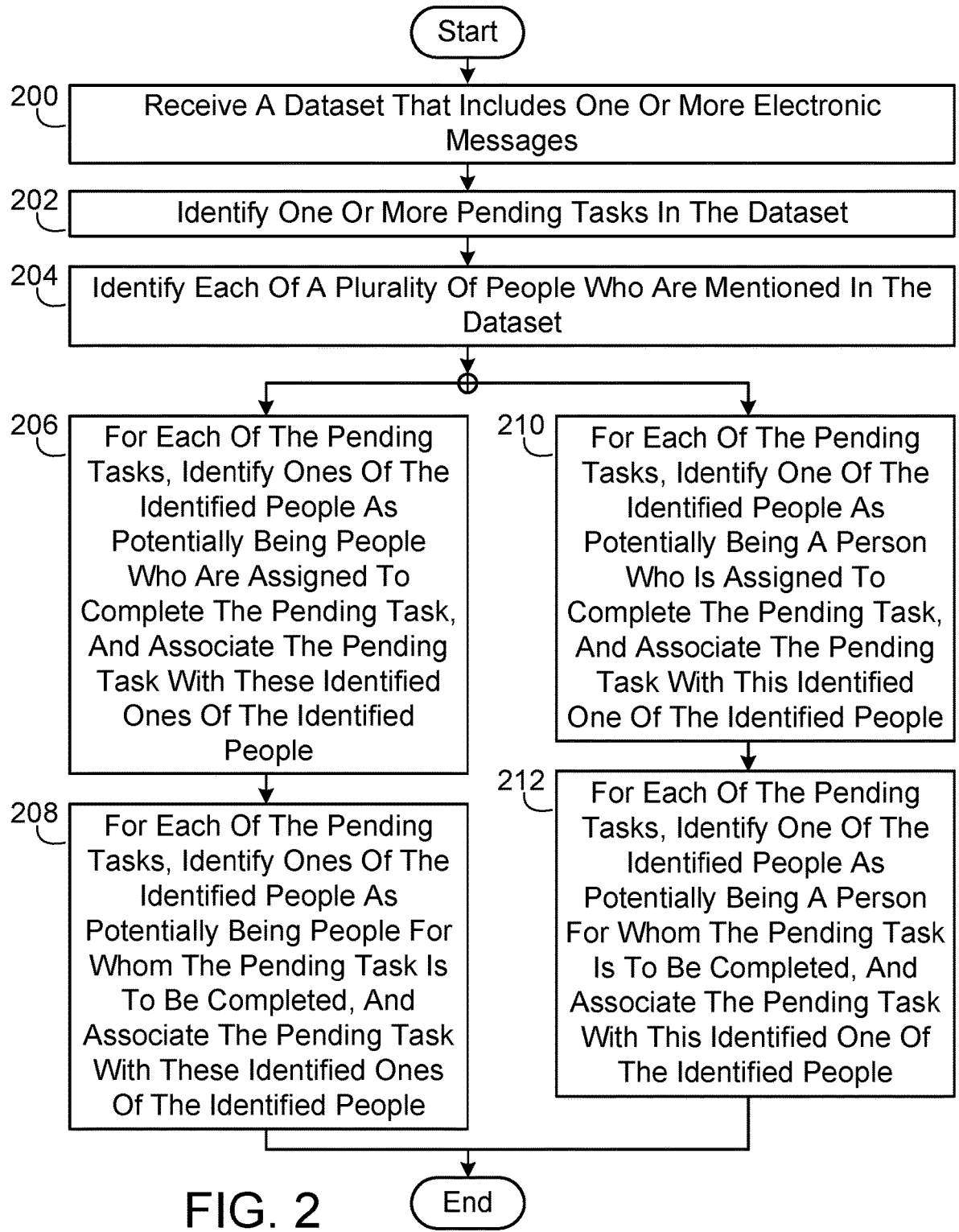
FIG. 2 is a flow diagram illustrating an exemplary implementation, in simplified form, of a process for identifying task assignments.

FIG. 2 illustrates an exemplary implementation, in simplified form, of a process for identifying task assignments. In an exemplary implementation of the task assignment identification technique described herein the process illustrated in FIG. 2 is realized on the system framework 100 illustrated in FIG. 1. As exemplified in FIG. 2, the process starts with receiving a dataset that includes one or more electronic messages (process action 200). Exemplary types of electronic messages that can be included in this dataset have been described heretofore. In an exemplary implementation of the task assignment identification technique the electronic messages in the dataset are associated with a conversation between a plurality of people. After the dataset has been received (action 200), one or more pending tasks in the dataset are identified (process action 202). It is noted that each of these pending tasks may be either confirmed or unconfirmed, where confirmed pending tasks may be either implicitly or explicitly confirmed. It will be appreciated that this pending task identification (action 202) can be performed in various ways. In an exemplary implementation of the task assignment identification technique the pending task identification (action 202) is performed using a conventional parsing method to extract sentences from the dataset, and then using conventional natural language processing and machine learning methods to identify any pending tasks in each of the extracted sentences. For example, such methods have shown the ability to successfully extract commitments that are made to others, requests that are made by others, and action items that are assigned to others.

Referring again to FIG. 2, in addition to identifying pending tasks in the dataset (action 202), each of a plurality of people who are mentioned in the dataset is also identified (process action 204). It is noted that a given person can be mentioned in the dataset in various ways. For example, a given person (e.g., "John Smith") can be mentioned in the dataset by just their first name ("John"), or a combination of their first name and last name ("John Smith"), or a combination of their first initial and last name ("J. Smith"), or a combination of their first name and last initial ("John S."), or just their last name ("Smith"), or their nickname (e.g., "jman"), or an alias (e.g., "jsmith"), or one or more of their email addresses (e.g., "jsmith@contoso.com"), among other possible ways of identifying a person. It will be appreciated that this mentioned people identification (action 204) can be performed in various ways. In an exemplary implementation of the task assignment identification technique described herein the mentioned people identification (action 204) is performed using a conventional parsing method in combination with conventional natural language processing and machine learning methods. After the pending tasks and each of the people who are mentioned in the dataset have been identified (actions 202 and 204), in one implementation of the task assignment identification technique, for each of the pending tasks, ones of the identified people may be identified as potentially being people who are assigned to complete the pending task, and the pending task may be associated with these identified ones of the identified people (process action 206). For each of the pending tasks, ones of the identified people may also be identified as potentially being people for whom the pending task is to be completed, and the pending task may be associated with these identified ones of the identified people (process action 208). In another implementation of the task assignment identification technique, for each of the pending tasks, one of the identified people may be identified as potentially being a person who is assigned to complete the pending task, and the pending task may be associated with this identified one of the identified people (process action 210). For each of the pending tasks, one of the identified people may also be identified as potentially being a person for whom the pending task is to be completed, and the pending task may be associated with this identified one of the identified people (process action 212).

Figure 3:
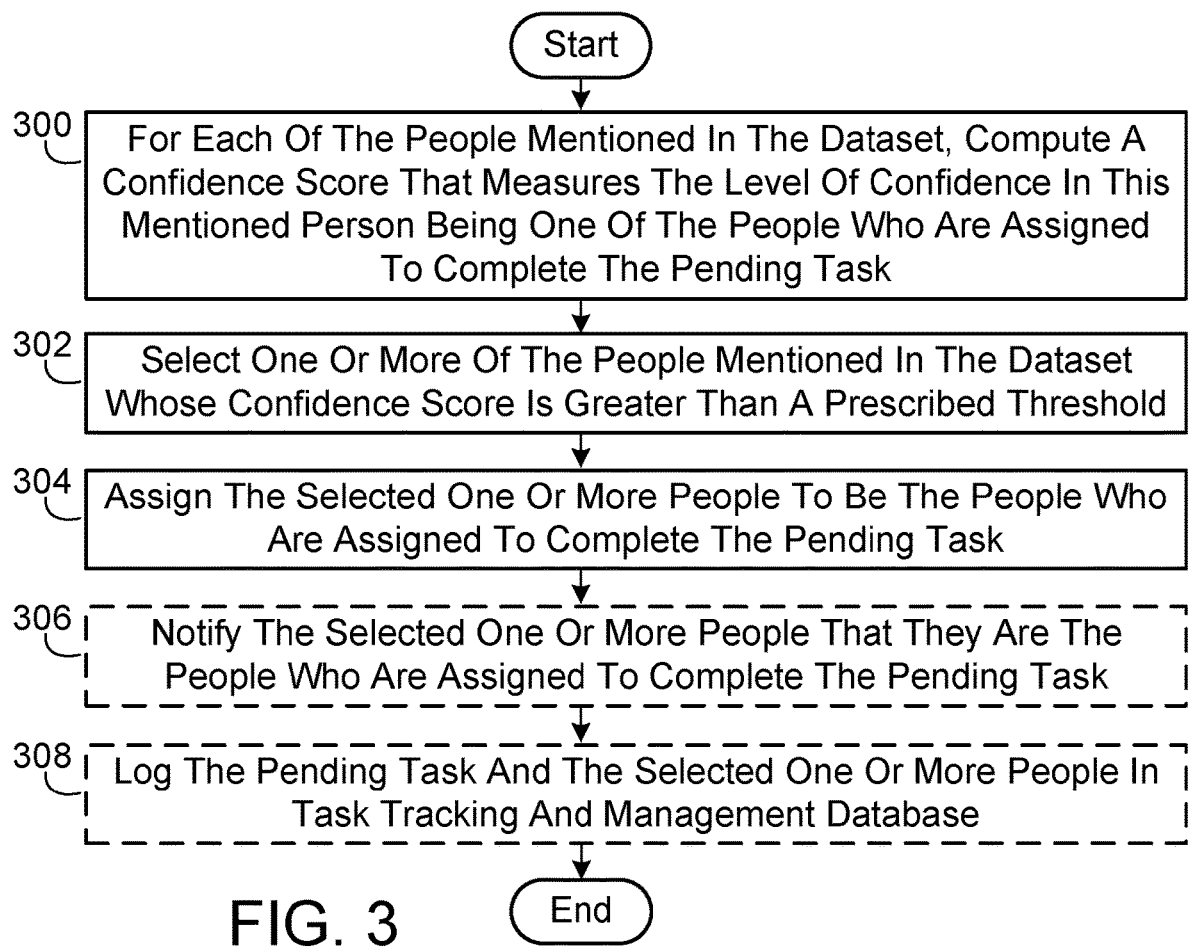
FIG. 3 is a flow diagram illustrating an exemplary implementation, in simplified form, of a process for identifying ones of a plurality of people who are mentioned in a dataset of electronic messages as potentially being people who are assigned to complete a pending task that is identified in this dataset.

FIG. 3 illustrates an exemplary implementation, in simplified form, of a process for identifying ones of the identified people as potentially being people who are assigned to complete the pending task. In other words, FIG. 3 illustrates an exemplary implementation of the action 206 that is shown in FIG. 2. It will be appreciated that this particular implementation supports the case where a plurality of people (e.g., a multi-person workgroup) is assigned to complete the pending task. As exemplified in FIG. 3, the process starts with, for each of the people who are mentioned in the dataset, computing a confidence score that measures (e.g., approximates) the level of confidence in this mentioned person being one of the people who are assigned to complete the pending task (process action 300), where this score computation is based on one or more message factors each of which is individually weighted to reflect its level of relevance to the confidence score. In other words, the weighting of each of the message factors determines the degree to which it contributes to the confidence score (e.g., a message factor having a high weight contributes more to the confidence score than another message factor having a low weight). Exemplary message factors that may be employed are described in more detail hereafter. One or more of the people who are mentioned in the dataset whose confidence score is greater than a prescribed threshold are then selected (process action 302), and these selected one or more people are assigned to be the people who are assigned to complete the pending task (process action 304). The selected one or more people can optionally be notified that they are the people who are assigned to complete the pending task (process action 306), and the pending task and the selected one or more people can optionally be logged in a conventional task tracking and management database (process action 308). The notification of action 306 can optionally ask each of the selected people to confirm their assignment to complete the pending task, and based on the responses received to this confirmation request can update the task tracking and management database accordingly and send out a new notification to the selected people informing them of any assignment changes that were made. For example, a given one of the selected/notified people may respond to the confirmation request and state that they are re-assigning (e.g., delegating) the task to another person. In the case where the selected/notified people include a plurality of people, one of these people may respond to the confirmation request and state that they are the sole person who is responsible for completing the task.

Figure 4:
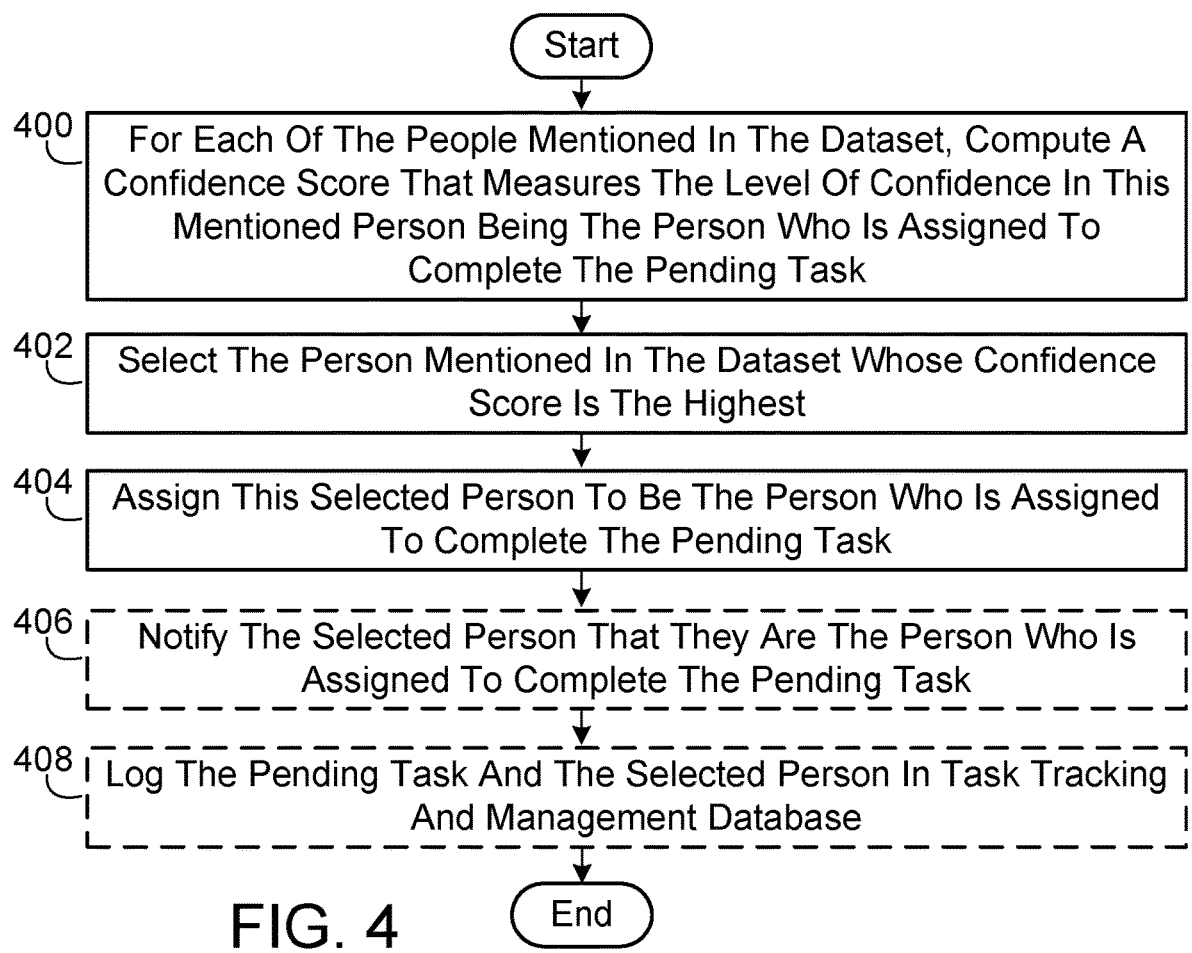
FIG. 4 is a flow diagram illustrating an exemplary implementation, in simplified form, of a process for identifying one of a plurality of people who are mentioned in the dataset of electronic messages as potentially being a person who is assigned to complete a pending task that is identified in this dataset.

FIG. 4 illustrates an exemplary implementation, in simplified form, of a process for identifying one of the identified people as potentially being a person who is assigned to complete the pending task. In other words, FIG. 4 illustrates an exemplary implementation of the action 210 that is shown in FIG. 2. As exemplified in FIG. 4, the process starts with, for each of the people who are mentioned in the dataset, computing a confidence score that measures the level of confidence in this mentioned person being the person who is assigned to complete the pending task (process action 400), where this score computation is based on one or more message factors each of which is individually weighted to reflect its level of relevance to the confidence score. The person who is mentioned in the dataset whose confidence score is the highest is then selected (process action 402), and this selected person is assigned to be the person who is assigned to complete the pending task (process action 404). The selected person can optionally be notified that they are the person who is assigned to complete the pending task (process action 406), and the pending task and the selected person can optionally be logged in the task tracking and management database (process action 408). The notification of action 406 can optionally ask the selected person to confirm their assignment to complete the pending task, and based on the response received to this confirmation request can update the task tracking and management database accordingly and send out a new notification of any assignment changes that were made. For example, the selected/notified person may respond to the confirmation request and state that they are re-assigning the task to another person.

Figure 5:
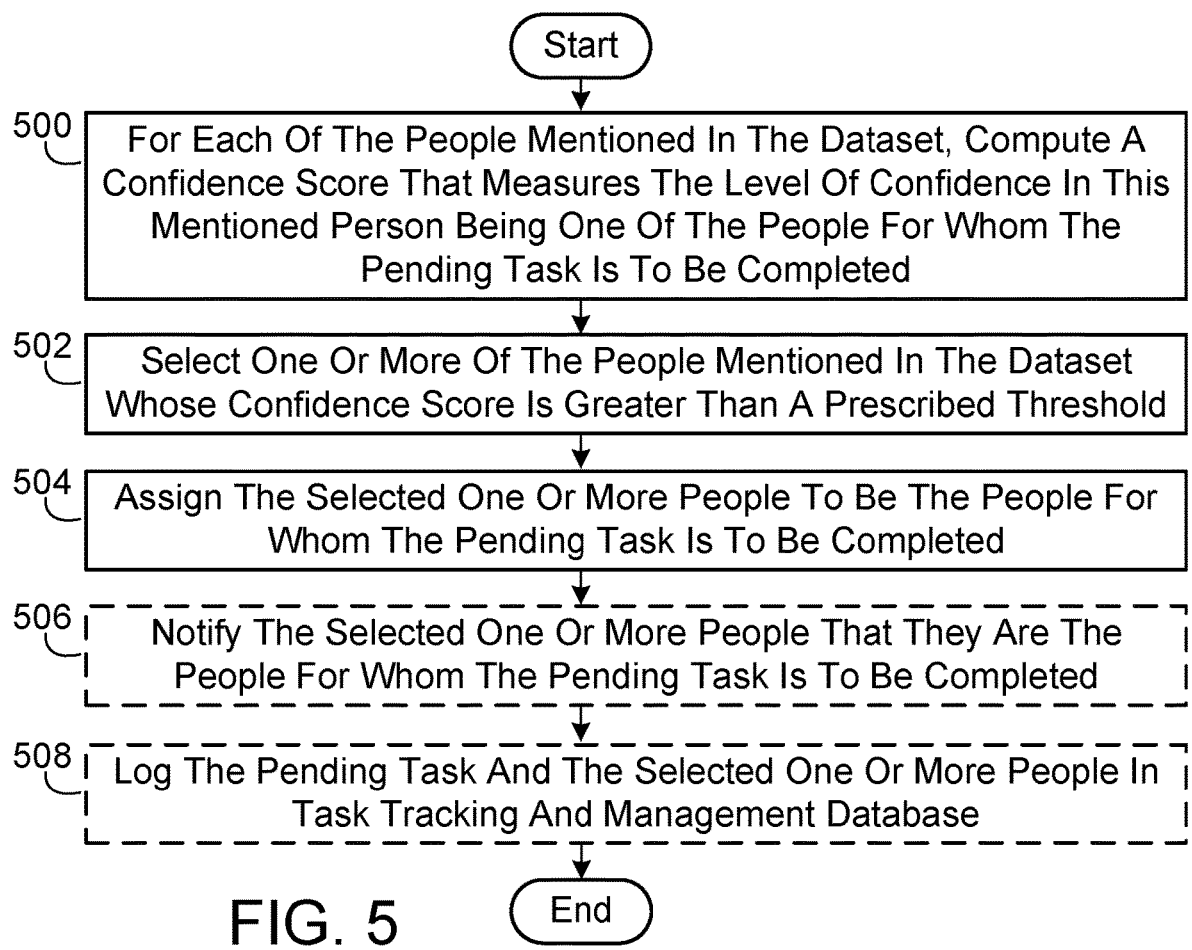
FIG. 5 is a flow diagram illustrating an exemplary implementation, in simplified form, of a process for identifying ones of a plurality of people who are mentioned in the dataset of electronic messages as potentially being people for whom a pending task that is identified in this dataset is to be completed.

FIG. 5 illustrates an exemplary implementation, in simplified form, of a process for identifying ones of the identified people as potentially being people for whom the pending task is to be completed. In other words, FIG. 5 illustrates an exemplary implementation of the action 208 that is shown in FIG. 2. As exemplified in FIG. 5, the process starts with, for each of the people who are mentioned in the dataset, computing a confidence score that measures the level of confidence in this mentioned person being one of the people for whom the pending task is to be completed (process action 500), where this score computation is based on one or more message factors each of which is individually weighted to reflect its level of relevance to the confidence score. One or more of the people who are mentioned in the dataset whose confidence score is greater than a prescribed threshold are then selected (process action 502), and these selected one or more people are assigned to be the people for whom the pending task is to be completed (process action 504). The selected one or more people can optionally be notified that they are the people for whom the pending task is to be completed (process action 506), and the pending task and the selected one or more people can optionally be logged in the task tracking and management database (process action 508).

Figure 6:
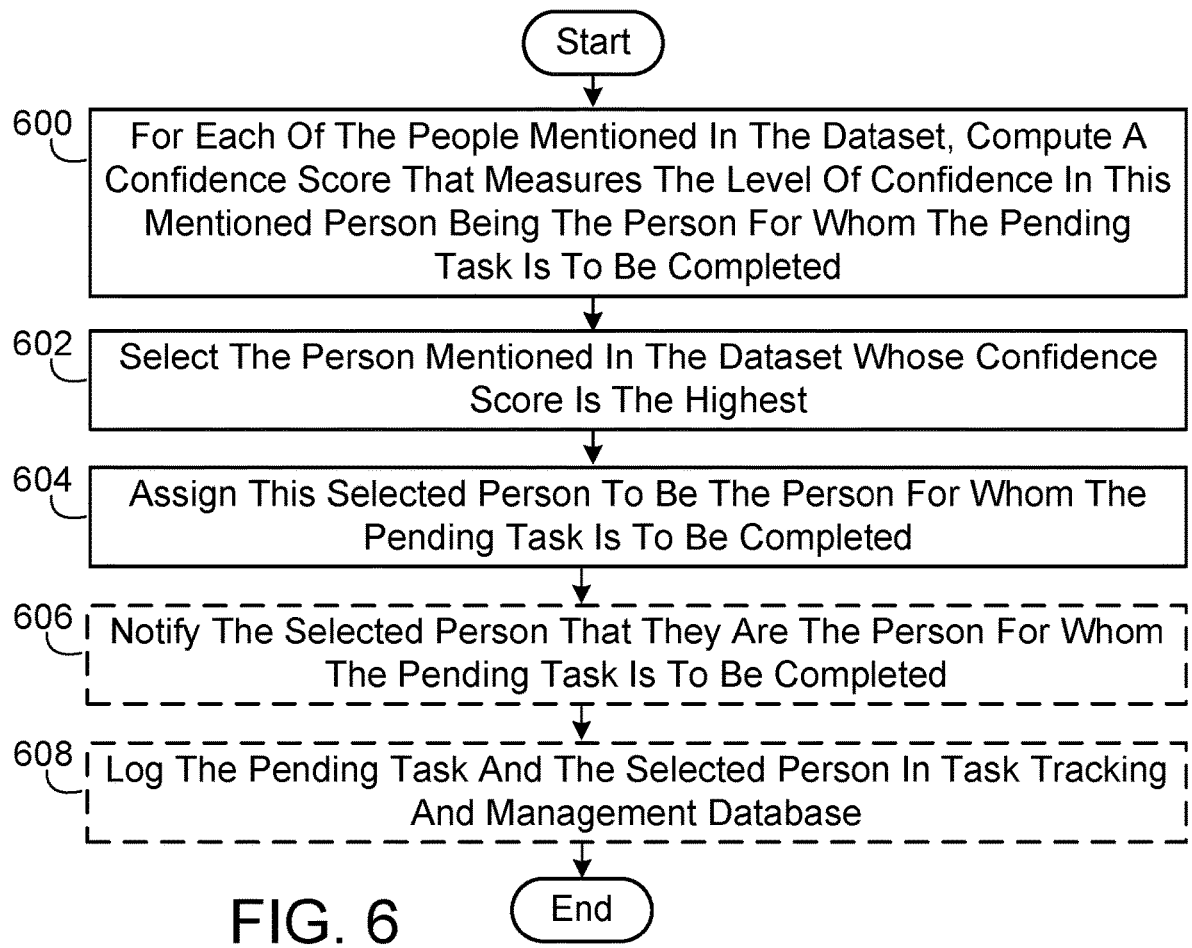
FIG. 6 is a flow diagram illustrating an exemplary implementation, in simplified form, of a process for identifying one of a plurality of people who are mentioned in the dataset of electronic messages as potentially being a person for whom a pending task that is identified in this dataset is to be completed.

FIG. 6 illustrates an exemplary implementation, in simplified form, of a process for identifying one of the identified people as potentially being a person for whom the pending task is to be completed. In other words, FIG. 6 illustrates an exemplary implementation of the action 212 that is shown in FIG. 2. As exemplified in FIG. 6, the process starts with, for each of the people who are mentioned in the dataset, computing a confidence score that measures the level of confidence in this mentioned person being the person for whom the pending task is to be completed (process action 600), where this score computation is based on one or more message factors each of which is individually weighted to reflect its level of relevance to the confidence score. The person who is mentioned in the dataset whose confidence score is the highest is then selected (process action 602), and this selected person is assigned to be the person for whom the pending task is to be completed (process action 604). The selected person can optionally be notified that they are the person for whom the pending task is to be completed (process action 606), and the pending task and the selected person can optionally be logged in the task tracking and management database (process action 608).

Referring again to FIGS. 3 and 4, the confidence score computation that is performed in actions 300 and 400 for each of the people who are mentioned in the dataset can employ a wide variety of different types of message factors which can be derived from a variety of different information sources such as the electronic messages themselves, or an information source specifying an organizational hierarchy (which may be used to determine a given person's job role and/or expertise), or documents the person has authored, or documents that explicitly mention the person and the tasks with which they are associated (e.g., product specifications, or presentations, or the like), or other historic information sources, or any combination of the just-described different information sources. By way of example but not limitation, in one implementation of the task assignment identification technique described herein the message factors may include the existence of one or more salutation phrases in the electronic messages that mention the person in any of a variety of ways such as by just their first name, or a combination of their first name and last name, or a combination of their first initial and last name, or a combination of their first name and last initial, or just their last name, or their nickname, or an alias, or their email address, or the like. In another implementation the message factors may include a frequency of interaction factor that measures how many of the electronic messages in the dataset were sent by the person and sent to the person. For example, in the case where the electronic messages include an email thread the frequency of interaction factor measures how active the person has been on this thread. In the case where the electronic messages include a currently active email thread and one or more past email threads the frequency of interaction factor measures how active the person has been within both the currently active and past email threads. In another implementation the message factors may include a communication medium factor that identifies the one or more types of communication media that the person used to send and receive electronic messages. In another implementation the message factors may include a relationship factor that operates as follows. In the case where the pending task (e.g., "sending a report by 5:00 PM on Friday") is stated in the electronic messages in the form of a request to the person from another person (e.g., "Hi John, Can you send me the report by 5:00 PM on Friday?"), the relationship factor measures the importance of the relationship between the person (e.g., "John") and this other person. In the case where the pending task is stated in the electronic messages in the form of a commitment from the person to another person (e.g., "Hi John, I will send you the report by 5:00 PM on Friday."), the relationship factor measures the importance of the relationship between the person and this other person (e.g., "John"). It is noted that the relationship factor can measure the importance of both personal and professional relationships. As such, in an exemplary scenario where Person A, Person B and Person C work for a company, and Person C is a manager to whom Person A and Person B report, the importance of the professional relationship between Person A and Person C may be deemed to be higher than the importance of the professional relationship between Person A and Person B. In another implementation where a one of the electronic messages is sent from a specific person (e.g., an email message, an instant text message, an instant multimedia message, a recorded voice message, a recorded video message, a web-based blog posting, a user posting on a social networking website, and a fax message are generally sent from a specific person), the message factors may include the specific person this one of the electronic messages is sent from. In another implementation where a one of the electronic messages is sent to one or more specific people (e.g., an email message, an instant text message, an instant multimedia message, a recorded voice message, a recorded video message, and a fax message are generally sent to specific people), the message factors may include the specific people this one of the electronic messages is sent to. In another implementation where the electronic messages include one or more sentences that mention the pending task, the message factors may include any people that are mentioned in these sentences. In another implementation the message factors may include whether or not the person was mentioned in the most recent one of the electronic messages, and if so, who else was mentioned in this message. In another implementation the message factors may include a frequency of assignment factor that measures how many previous pending tasks the person has been assigned to complete. In one version of this implementation the frequency of assignment factor can measure how many previous tasks in general the person has been assigned to complete; in another version the frequency of assignment factor can measure just the previous tasks that are similar to the current pending task. In another implementation the message factors may include a frequency of meetings factor that measures how many meetings the person participates in. In one version of this implementation the frequency of meetings factor can measure how many meeting in general the person participates in; in another version the frequency of meetings factor can measure just the meetings the person participates in that are related to the topic of the task. In another implementation where the electronic messages include a reference to one or more documents, the message factors may include a document relationship factor that measures the relationship between the person and each of the documents. For example, in the case where the electronic messages include the statement "please update the Reports-2016 slide deck" the document relationship factor may employ a shared document database to detect that the person has been working on the Reports-2016 slide deck with one or more other people. In another implementation the message factors may include a keywords factor that identifies one or more keywords that are associated with one or more recipients of the most recent one of the electronic messages. For example, in the case where the electronic messages mention a plurality of software developers, the most recent one of the electronic messages is an email message that includes the statement "Fix the bug by the end of the week", and this message is sent to a particular one of the software developers and a test engineer and a sales person, the keywords factor would associate the word "bug" with this particular one of the software developers. In another implementation the message factors may include a previously completed tasks factor that measures how many previous tasks the person has successfully completed. In another implementation the message factors may include a capability factor that measures the likelihood that the person will be able to successfully complete the pending task. It will be appreciated that the capability factor may be computed using one or more of the aforementioned different information sources.

Referring again to FIGS. 5 and 6, the confidence score computation that is performed in actions 500 and 600 for each of the people who are mentioned in the dataset can also employ a wide variety of different types of message factors which can be derived from the variety of different information sources described heretofore. By way of example but not limitation, in one implementation of the task assignment identification technique described herein the message factors may include the aforementioned existence of one or more salutation phrases in the electronic messages that mention the person in any of the variety of ways described heretofore. In another implementation the message factors may include the aforementioned frequency of interaction factor. In another implementation the message factors may include the aforementioned communication medium factor. In another implementation the message factors may include the aforementioned relationship factor. In another implementation where a one of the electronic messages is sent from a specific person, the message factors may include the specific person this one of the electronic messages is sent from. In another implementation where a one of the electronic messages is sent to one or more specific people, the message factors may include the specific people this one of the electronic messages is sent to. In another implementation where the electronic messages include one or more sentences that mention the pending task, the message factors may include any people that are mentioned in these sentences. In another implementation the message factors may include whether or not the person was mentioned in the most recent one of the electronic messages, and if so, who else was mentioned in this message. In another implementation the message factors may include another frequency of assignment factor that measures how many previous pending tasks were to be completed for the person. In another implementation the message factors may include the aforementioned frequency of meetings factor. In another implementation where the electronic messages include a reference to one or more documents, the message factors may include the aforementioned document relationship factor. In another implementation the message factors may include the aforementioned keywords factor. In another implementation the message factors may include another previously completed tasks factor that measures how many previous tasks have been successfully completed for the person.

Referring again to FIGS. 3-6, it will be appreciated that the aforementioned notification of actions 306, 406, 506 and 606 can be realized in various ways. By way of example but not limitation, in one implementation of the task assignment identification technique described herein a given person's association with a given pending task (e.g., the fact that the person is assigned to complete the pending task, or the fact that the pending task is to be completed for the person) can be automatically input to the person's calendar. In another implementation of the task assignment identification technique a given person's association with a given pending task can be automatically input to a to-do list for the person. In yet another implementation of the task assignment identification technique a given person's association with a given pending task can be automatically displayed to the person in the form of a pop-up message in a variety of application contexts. For example, in the case where Person A is assigned to complete Task X for Person B, whenever Person A communicates an electronic message to Person B a pop-up message can be automatically displayed to Person A reminding them that they are assigned to complete Task X for Person B; similarly, whenever Person B communicates an electronic message to Person A a pop-up message can be automatically displayed to Person B reminding them that Person A is assigned to complete Task X for them.

Consider an electronic message that is sent from Mark to just John and includes the statement "Hey John, can you get that bug report to me by Friday?". The task assignment identification technique implementations described herein will identify that writing the bug report is a pending task, and that a salutation phrase exists in the message that mentions just John, and that the message is sent from Mark, and that the message is just sent to John. As such, the task assignment identification technique implementations will identify John as being the person who is assigned to complete the task of writing the bug report, and will identify Mark as being the person for whom this task is to be completed. In an alternate case where the just-described electronic message does not include the salutation phrase "Hey John,", or where the message is sent to other people besides John, the task assignment identification technique implementations will still identify John as being the person who is assigned to complete the task of writing the bug report, and will still identify Mark as being the person for whom this task is to be completed. In another alternate case where the electronic message is sent to more than one person having the first name John, it will be appreciated that the task assignment identification technique implementations described herein will be able to disambiguate between the plurality of Johns and assign the task of writing the bug report to the appropriate John.

Consider another electronic message that is sent from Mary to Jane (who works for Mary), and to Jack (who is Mary's boss), and to Peter (who is Jack's boss), where this message includes the statement "Hi Jack, Jane will get you the information you requested by the end of the day today.". The task assignment identification technique implementations described herein will identify that getting Jack the information he requested is a pending task, and that a salutation phrase exists in the message that mentions just Jack, and that the message is sent from Mary, and that the message is sent to Jane, Jack and Peter. As such, the task assignment identification technique implementations will identify Jane as being the person who is assigned to complete the task of getting Jack the information he requested by the end of the day, and will identify Jack as being the person for whom this task is to be completed.

Figure 7:
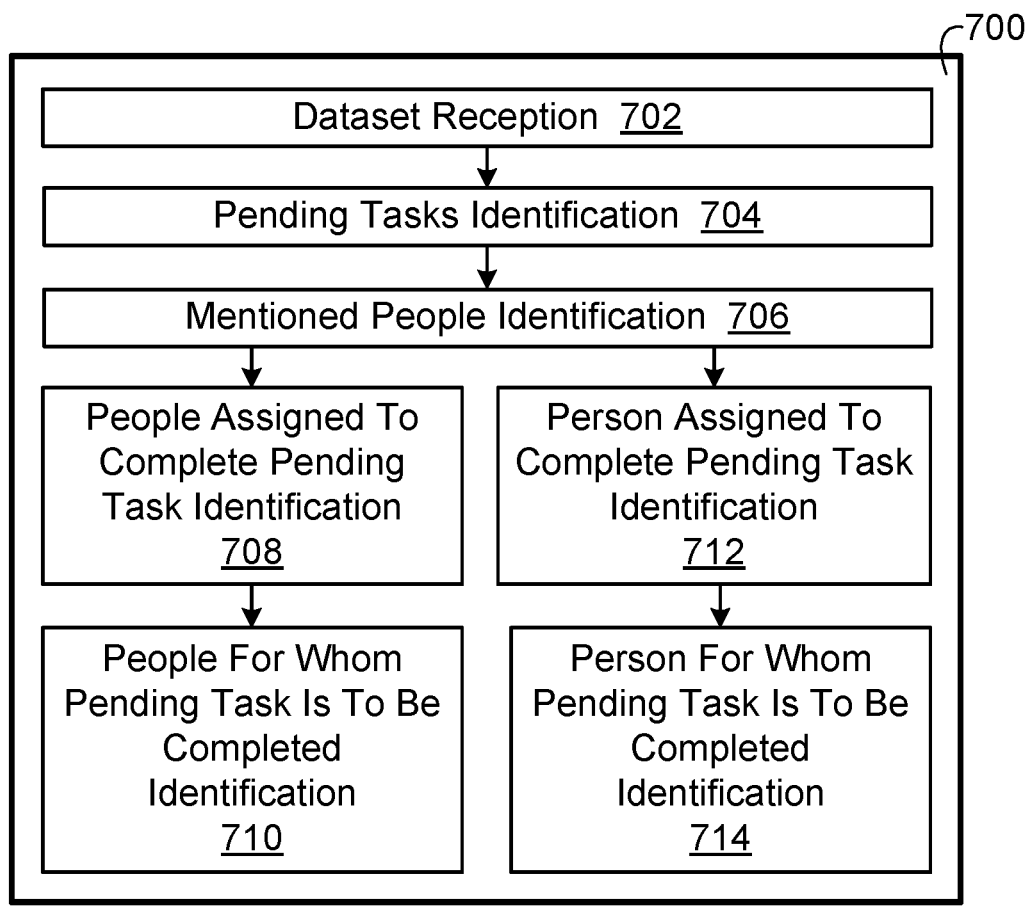
FIG. 7 is a diagram illustrating an exemplary implementation, in simplified form, of a task assignment identifier computer program for identifying task assignments.

FIG. 7 illustrates an exemplary implementation, in simplified form, of a task assignment identifier computer program for identifying task assignments. As exemplified in FIG. 7 and referring again to FIG. 2, the task assignment identifier computer program 700 includes, but is not limited to, a dataset reception sub-program 702 that performs action 200, a pending tasks identification sub-program 704 that performs action 202, a mentioned people identification sub-program 706 that performs action 204, a people assigned to complete pending task identification sub-program 708 that performs action 206, a people for whom pending task is to be completed identification sub-program 710 that performs action 208, a person assigned to complete pending task identification sub-program 712 that performs action 210, and a person for whom pending task is to be completed identification sub-program 714 that performs action 212. Each of the just-described sub-programs is realized on a computing device such as that which is described in more detail in the Exemplary Operating Environments section which follows. More particularly and by way of example but not limitation, and referring again to FIG. 1, in one implementation of the task assignment identification technique described herein the just-described sub-programs may be realized on the computing devices 118/120.

3.0 Other Implementations

While the task assignment identification technique has been described by specific reference to implementations thereof, it is understood that variations and modifications thereof can be made without departing from the true spirit and scope of the task assignment identification technique. It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Exemplary Operating Environments

Figure 8:
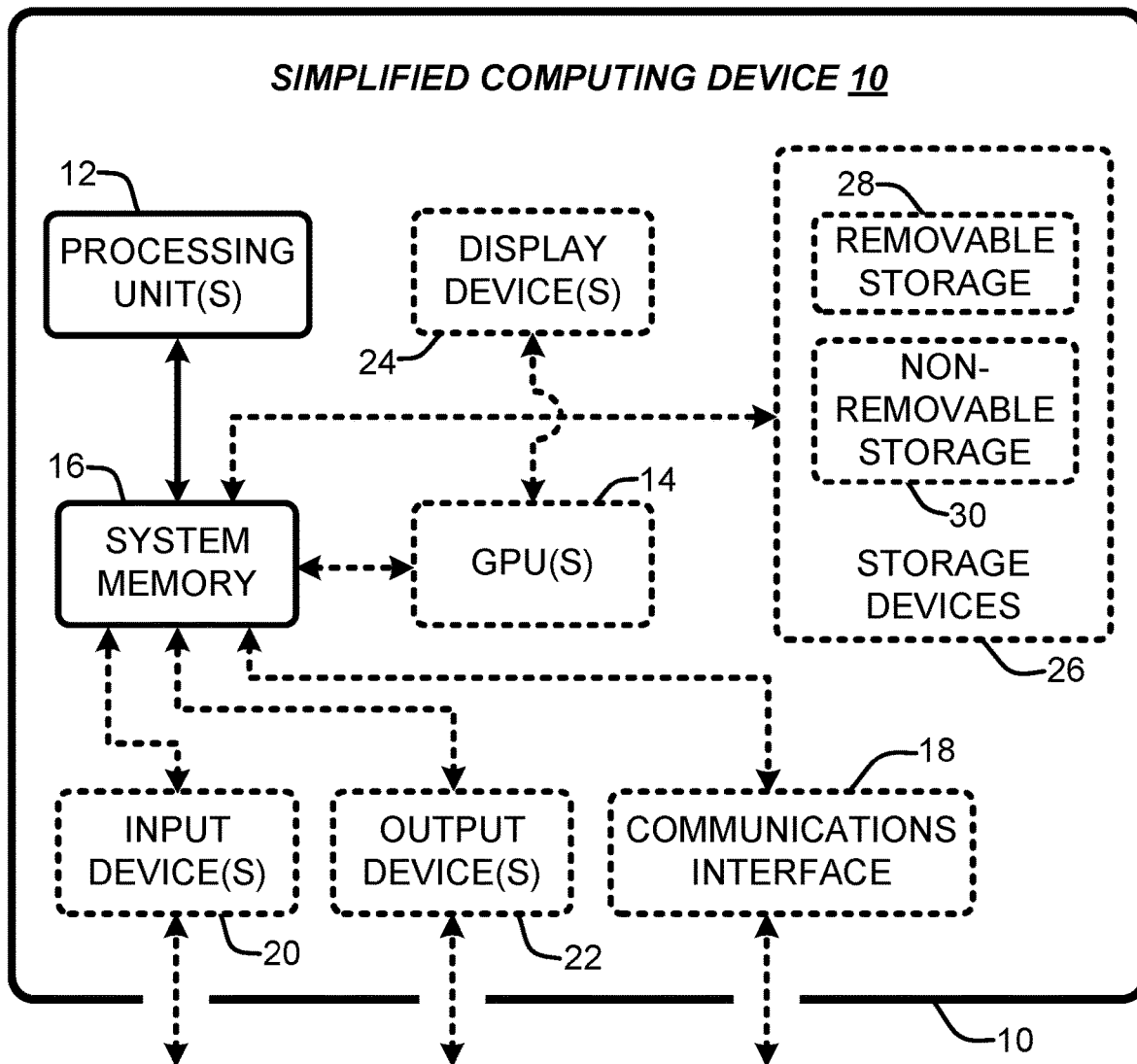
FIG. 8 is a diagram illustrating a simplified example of a general-purpose computer system on which various implementations and elements of the task assignment identification technique, as described herein, may be realized.

The task assignment identification technique implementations described herein are operational within numerous types of general purpose or special purpose computing system environments or configurations. FIG. 8 illustrates a simplified example of a general-purpose computer system on which various implementations and elements of the task assignment identification technique, as described herein, may be implemented. It is noted that any boxes that are represented by broken or dashed lines in the simplified computing device 10 shown in FIG. 8 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the task assignment identification technique implementations described herein, the device should have a sufficient computational capability and system memory to enable basic computational operations. In particular, the computational capability of the simplified computing device 10 shown in FIG. 8 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the task assignment identification technique implementations described herein, including input, output, control, feedback, and response to one or more users or other devices or systems associated with the task assignment identification technique implementations, are enabled by a variety of Natural User Interface (NUI) scenarios. The NUI techniques and scenarios enabled by the task assignment identification technique implementations include, but are not limited to, interface technologies that allow one or more users user to interact with the task assignment identification technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the task assignment identification technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the task assignment identification technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 8 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various task assignment identification technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The task assignment identification technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The task assignment identification technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

5.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation a system is employed for identifying task assignments. This system includes a task assignment identifier that includes one or more computing devices, the computing devices being in communication with each other via a computer network whenever there is a plurality of computing devices, and a computer program having a plurality of sub-programs executable by the computing devices, where the sub-programs configure the computing devices to, receive a dataset that includes one or more electronic messages, identify one or more pending tasks in the dataset, identify each of a plurality of people who are mentioned in the dataset, and for each of the pending tasks, identify ones of the identified people as potentially being people who are assigned to complete the pending task, and associate the pending task with these identified ones of the identified people.

In one implementation of the just-described system the one or more electronic messages include one or more email messages. In one version of this implementation the one or more email messages include one or more email threads. In another implementation the one or more electronic messages include one or more of: one or more instant text messages; or one or more instant multimedia messages. In another implementation the one or more electronic messages include one or more of: one or more recorded voice messages having been converted to text using a speech-to-text conversion method; or one or more recorded video messages comprising audio having been converted to text using a speech-to-text conversion method. In another implementation the one or more electronic messages include one or more of: one or more web-based blog postings; or one or more user postings on one or more social networking websites. In another implementation the one or more electronic messages include one or more fax messages having been converted to text using an optical character recognition method.

In another implementation the sub-program for identifying ones of the identified people as potentially being people who are assigned to complete the pending task includes sub-programs for: for each of the people who are mentioned in the dataset, computing a confidence score that measures the level of confidence in this mentioned person being one of the people who are assigned to complete the pending task, this score computation being based on one or more message factors each of which is individually weighted to reflect its level of relevance to the confidence score, selecting one or more of the people who are mentioned in the dataset whose confidence score is greater than a prescribed threshold, and assigning these selected one or more people to be the people who are assigned to complete the pending task. In one version of this implementation the sub-program for identifying ones of the identified people as potentially being people who are assigned to complete the pending task further includes a sub-program for notifying the selected one or more people that they are the people who are assigned to complete the pending task. In another version of the implementation the one or more message factors include: the existence of one or more salutation phrases in the electronic messages that mention the person; or a frequency of interaction factor that measures how many of the electronic messages in the dataset were sent by the person and sent to the person; or a communication medium factor that identifies the one or more types of communication media that the person used to send and receive electronic messages; or a relationship factor, wherein whenever the pending task is stated in the electronic messages in the form of a request to the person from another person, or in the form of a commitment from the person to this other person, the relationship factor measures the importance of the relationship between the person and this other person; or whether or not the person was mentioned in the most recent one of the electronic messages, and if so, who else was mentioned in this one of the electronic messages; or a frequency of assignment factor that measures how many previous pending tasks the person has been assigned to complete; or a frequency of meetings factor that measures how many meetings the person participates in; or a keywords factor that identifies one or more keywords that are associated with one or more recipients of the most recent one of the electronic messages; or a previously completed tasks factor that measures how many previous tasks the person has completed; or a capability factor that measures the likelihood that the person will be able to complete the pending task. In yet another version of the implementation, whenever a one of the electronic messages is sent from a specific person, the one or more message factors include the specific person this one of the electronic messages is sent from; whenever a one of the electronic messages is sent to one or more specific people, the one or more message factors include the specific people this one of the electronic messages is sent to; whenever the electronic messages include a reference to one or more documents, the one or more message factors include a document relationship factor that measures the relationship between the person and each of the documents; and whenever the electronic messages include one or more sentences that mention the pending task, the one or more message factors include any people that are mentioned in these sentences.

In another implementation the sub-programs of the computer program further configure the computing devices to: for each of the pending tasks, identify ones of the identified people as potentially being people for whom the pending task is to be completed, and associate the pending task with the ones of the identified people that are identified as potentially being people for whom the pending task is to be completed. In one version of this implementation the sub-program for identifying ones of the identified people as potentially being people for whom the pending task is to be completed includes sub-programs for: for each of the people who are mentioned in the dataset, computing a confidence score that measures the level of confidence in this mentioned person being one of the people for whom the pending task is to be completed, this score computation being based on one or more message factors each of which is individually weighted to reflect its level of relevance to the confidence score, selecting one or more of the people who are mentioned in the dataset whose confidence score is greater than a prescribed threshold, and assigning this selected one or more people to be the people for whom the pending task is to be completed.

In one variant of the just-described version of the just-described implementation, the sub-program for identifying ones of the identified people as potentially being people for whom the pending task is to be completed further includes a sub-program for notifying the selected one or more people that they are the people for whom the pending task is to be completed. In another variant the one or more message factors include: the existence of one or more salutation phrases in the electronic messages that mention the person; or a frequency of interaction factor that measures how many of the electronic messages in the dataset were sent by the person and sent to the person; or a communication medium factor that identifies the one or more types of communication media that the person used to send and receive electronic messages; or a relationship factor, wherein whenever the pending task is stated in the electronic messages in the form of a request to the person from another person, or in the form of a commitment from the person to this other person, the relationship factor measures the importance of the relationship between the person and this other person; or whether or not the person was mentioned in the most recent one of the electronic messages, and if so, who else was mentioned in this one of the electronic messages; or a frequency of assignment factor that measures how many previous pending tasks were to be completed for the person; or a frequency of meetings factor that measures how many meetings the person participates in; or a keywords factor that identifies one or more keywords that are associated with one or more recipients of the most recent one of the electronic messages; or a previously completed tasks factor that measures how many previous tasks have been completed for the person. In yet another variant, whenever a one of the electronic messages is sent from a specific person, the one or more message factors include the specific person this one of the electronic messages is sent from; whenever a one of the electronic messages is sent to one or more specific people, the one or more message factors include the specific people this one of the electronic messages is sent to; whenever the electronic messages include a reference to one or more documents, the one or more message factors include a document relationship factor that measures the relationship between the person and each of the documents; and whenever the electronic messages include one or more sentences that mention the pending task, the one or more message factors include any people that are mentioned in these sentences.

The implementations, versions and variants described in any of the previous paragraphs in this section may also be combined with each other, and with one or more of the implementations and versions described prior to this section. For example, some or all of the preceding implementations, versions and variants may be combined with the foregoing implementation where the sub-program for identifying ones of the identified people as potentially being people who are assigned to complete the pending task includes sub-programs for: for each of the people who are mentioned in the dataset, computing a confidence score that measures the level of confidence in this mentioned person being one of the people who are assigned to complete the pending task, this score computation being based on one or more message factors each of which is individually weighted to reflect its level of relevance to the confidence score, selecting one or more of the people who are mentioned in the dataset whose confidence score is greater than a prescribed threshold, and assigning this selected one or more people to be the people who are assigned to complete the pending task. In addition some or all of the preceding implementations, versions and variants may be combined with the foregoing implementation where the sub-programs of the computer program further configure the computing devices to: for each of the pending tasks, identify ones of the identified people as potentially being people for whom the pending task is to be completed, and associate the pending task with the ones of the identified people that are identified as potentially being people for whom the pending task is to be completed.

In another implementation a computer-implemented process is employed for identifying task assignments. This process includes the actions of: using one or more computing devices to perform the following process actions, the computing devices being in communication with each other via a computer network whenever a plurality of computing devices is used: receiving a dataset that includes one or more electronic messages; identifying one or more pending tasks in the dataset; identifying each of a plurality of people who are mentioned in the dataset; and for each of the pending tasks, identifying ones of the identified people as potentially being people who are assigned to complete the pending task, and associating the pending task with these identified ones of the identified people.

In one implementation of the just-described process, the process further includes the actions of: for each of the pending tasks, identifying ones of the identified people as potentially being people for whom the pending task is to be completed, and associating the pending task with the ones of the identified people that are identified as potentially being people for whom the pending task is to be completed.

In another implementation another system is employed for identifying task assignments. This system includes another task assignment identifier that includes one or more computing devices, the computing devices being in communication with each other via a computer network whenever there is a plurality of computing devices, and a computer program having a plurality of sub-programs executable by the computing devices, where the sub-programs configure the computing devices to, receive a dataset that includes one or more electronic messages, identify one or more pending tasks in the dataset, identify each of a plurality of people who are mentioned in the dataset, and for each of the pending tasks, identify one of the identified people as potentially being a person who is assigned to complete the pending task, and associate the pending task with this identified one of the identified people.

In one implementation of the just-described system the sub-programs of the computer program further configure the computing devices to: for each of the pending tasks, identify one of the identified people as potentially being a person for whom the pending task is to be completed, and associate the pending task with the one of the identified people that are identified as potentially being a person for whom the pending task is to be completed.

In another implementation a task assignment identification system is implemented by a means for identifying task assignments. The task assignment identification system includes a task assignment identifier that includes one or more computing devices. These computing devices are in communication with each other via a computer network whenever there is a plurality of computing devices. These computing devices include processors configured to execute a reception step for receiving a dataset that includes one or more electronic messages, a first identification step for identifying one or more pending tasks in the dataset, a second identification step for identifying each of a plurality of people who are mentioned in the dataset, and for each of the pending tasks, a third identification step for identifying ones of the identified people as potentially being people who are assigned to complete the pending task, and a first association step for associating the pending task with these identified ones of the identified people.

In one implementation of the just-described task assignment identification system the third identification step for identifying ones of the identified people as potentially being people who are assigned to complete the pending task includes: for each of the people who are mentioned in the dataset, a first computation step for computing a confidence score that measures the level of confidence in the mentioned person being one of the people who are assigned to complete the pending task, this score computation being based on one or more message factors each of which is individually weighted to reflect its level of relevance to the confidence score, a first selection step for selecting one or more of the people who are mentioned in the dataset whose confidence score is greater than a prescribed threshold, and a first assignment step for assigning these selected one or more people to be the people who are assigned to complete the pending task.

In one version of the task assignment identification system the third identification step for identifying ones of the identified people as potentially being people who are assigned to complete the pending task further includes a first notification step for notifying the selected one or more people that they are the people who are assigned to complete the pending task.

In another implementation the processors are further configured to execute, for each of the pending tasks, a fourth identification step for identifying ones of the identified people as potentially being people for whom the pending task is to be completed, and a second association step for associating the pending task with the ones of the identified people that are identified as potentially being people for whom the pending task is to be completed.

In another version of the task assignment identification system the fourth identification step for identifying ones of the identified people as potentially being people for whom the pending task is to be completed includes: for each of the people who are mentioned in the dataset, a second computation step for computing a confidence score that measures the level of confidence in this mentioned person being one of the people for whom the pending task is to be completed, this score computation being based on one or more message factors each of which is individually weighted to reflect its level of relevance to the confidence score, a second selection step for selecting one or more of the people who are mentioned in the dataset whose confidence score is greater than a prescribed threshold, and a second assignment step for assigning said selected one or more people to be the people for whom the pending task is to be completed.

In one variant of the task assignment identification system the fourth identification step for identifying ones of the identified people as potentially being people for whom the pending task is to be completed further includes a second notification step for notifying the selected one or more people that they are the people for whom the pending task is to be completed.

Wherefore, what is claimed is:

1. A system for identifying task assignments, the system comprising one or more processors and one or more computer-readable storage media, the one or more computer-readable storage media comprising computer-readable instructions that are executable by the one or more processors to:
   receive, over a computer network and at a communications interface, a dataset comprising one or more electronic messages and identifiers indicating a plurality of persons;
   parsing, from the one or more electronic messages, sentences via natural language processing and running the parsed sentences through a machine learning model;
   based on the running of the parsed sentences through the machine learning model, identify, in the one or more electronic messages, one or more pending tasks, wherein the one or more electronic messages include natural language content without regard to an identity of the plurality of persons;
   parsing, from the dataset, the identifiers via the natural language processing and running the parsed identifiers through the machine learning model;
   based on the running of the parsed identifiers through the machine learning model, identify each person of the plurality of persons who are indicated in the dataset;
   based at least in part on: the identifying of the one or more pending tasks, the identifying of each person, and the one or more electronic messages including natural language content without regard to an identity of the one or more persons, compute a confidence score for each identified person indicated in the dataset, the confidence score indicating a level of confidence that the identified person is assigned to complete each pending task of the one or more pending tasks;
   select at least one identified person of the plurality of persons as being assigned to complete the pending task based on the computed confidence score for each identified person; and
   store, in computer memory, the pending task associated with the at least one identified person selected.

2. The system of claim 1, wherein the one or more electronic messages comprise one or more email messages.

3. The system of claim 2 wherein the one or more email messages comprise one or more email threads.

4. The system of claim 1, wherein the one or more electronic messages comprise one or more of:
   one or more instant text messages; or
   one or more instant multimedia messages.

5. The system of claim 1, wherein the one or more electronic messages comprise one or more of:
   one or more recorded voice messages having been converted to text using a speech-to-text conversion method; or
   one or more recorded video messages comprising audio having been converted to text using the speech-to-text conversion method.

6. The system of claim 1, wherein the one or more electronic messages comprise one or more of:
   one or more web-based blog postings; or
   one or more user postings on one or more social networking websites.

7. The system of claim 1, wherein the one or more electronic messages comprise one or more fax messages having been converted to text using an optical character recognition method.

8. The system of claim 1, wherein a sub-program for selecting the at least one identified person to assign to complete the pending task comprises sub-programs for:
   for each identified person mentioned in the dataset, computing the confidence score based on one or more message factors each of which is individually weighted to reflect its level of relevance to the confidence score,
   selecting the at least one identified person who is mentioned in the dataset whose confidence score is greater than a prescribed threshold, and
   assigning the at least one identified person selected to complete the pending task.

9. The system of claim 8, wherein the sub-program for selecting the at least one identified person to assign to complete the pending task further comprises a sub-program for notifying the at least one identified person selected that they are assigned to complete the pending task.

10. The system of claim 8, wherein the one or more message factors comprise:
an existence of one or more salutation phrases in electronic messages that mention the identified person;
an interaction frequency factor that measures how many of the electronic messages in the dataset were sent by the identified person and sent to the identified person;
a communication medium factor that identifies one or more types of communication media that the identified person used to send and receive the electronic messages;
a relationship factor, wherein whenever the pending task is stated in the electronic messages as a request to the identified person from an other person, or as a commitment from the identified person to said other person, the relationship factor measures an importance of a relationship between the identified person and said other person; and
whether or not the identified person was mentioned in a most recent one of the electronic messages, and if so, who else was mentioned in the most recent one of the electronic messages; or
an assignment frequency factor that measures how many previous pending tasks the identified person has been assigned to complete; or
a meetings frequency factor that measures how many meetings the identified person participates in; or
a keywords factor that identifies one or more keywords that are associated with one or more recipients of the most recent one of the electronic messages; or
a previously completed tasks factor that measures how many previous tasks the identified person has completed; or
a capability factor that measures a likelihood that the identified person will be able to complete the pending task.

11. The system of claim 8, wherein,
whenever one of the electronic messages is sent from a specific person, the one or more message factors comprise the specific person that said one of the electronic messages is sent from;
whenever a select electronic message is sent to one or more specific people, the one or more message factors comprise the one or more specific people said select electronic message is sent to;
whenever the electronic messages comprise a reference to one or more documents, the one or more message factors comprise a document relationship factor that measures a relationship between the identified person and each of the documents; and
whenever the electronic messages comprise one or more sentences that mention the pending task, the one or more message factors comprise any people that are mentioned in said one or more sentences.

12. The system of claim 1, wherein a sub-program of the computer program further configure said one or more computing devices to:
for each pending task,
identify a subset of people who are indicated in the dataset as potentially being people for whom the pending task is to be completed, and
associate the pending task with the subset of the people that are identified as potentially being people for whom the pending task is to be completed.

13. The system of claim 12, wherein the sub-program for identifying the subset of people as potentially being people for whom the pending task is to be completed comprises sub-programs for:
computing a second confidence score for each identified person indicated in the dataset, the second confidence score measuring a second level of confidence of the identified person being one of the subset of people for whom the pending task is to be completed, said computing the second confidence score being based on one or more message factors each of which is individually weighted to reflect its level of relevance to the second confidence score,
selecting one or more identified persons whose second confidence score is greater than a prescribed threshold, and
assigning said one or more identified persons selected to be the subset of people for whom the pending task is to be completed.

14. The system of claim 13, wherein the sub-program for identifying the subset of people as potentially being people for whom the pending task is to be completed further comprises a sub-program for notifying the subset of people that the pending task is to be completed for them.

15. The system of claim 13, wherein the one or more message factors comprise:
an existence of one or more salutation phrases in electronic messages that mention the identified person; or
an interaction frequency factor that measures how many of the electronic messages in the dataset were sent by the identified person and sent to the identified person; or
a communication medium factor that identifies one or more types of communication media that the identified person used to send and receive the electronic messages; or
a relationship factor, wherein whenever the pending task is stated in the electronic messages as a request to the identified person from an other person, or as a commitment from the identified person to said other person, the relationship factor measures an importance of a relationship between the identified person and said other person; or
whether or not the identified person was mentioned in a most recent one of the electronic messages, and if so, who else was mentioned in the most recent one of the electronic messages; or
an assignment frequency factor that measures how many previous pending tasks were to be completed for the identified person; or
a meetings frequency factor that measures how many meetings the identified person participates in; or
a keywords factor that identifies one or more keywords that are associated with one or more recipients of the most recent one of the electronic messages; or
a previously completed tasks factor that measures how many previous tasks have been completed for the identified person.

16. The system of claim 13, wherein,
whenever one of the electronic messages is sent from a specific person, the one or more message factors comprise the specific person said one of the electronic messages is sent from;
whenever a select electronic message is sent to one or more specific people, the one or more message factors comprise the one or more specific people said select electronic message is sent to;

whenever the electronic messages comprise a reference to one or more documents, the one or more message factors comprise a document relationship factor that measures a relationship between the identified person and each of the one or more documents; and whenever the electronic messages comprise one or more sentences that mention the pending task, the one or more message factors comprise any people that are mentioned in said one or more sentences.

17. A computer-implemented process for identifying task assignments, the computer-implemented process comprising:

receiving, over a computer network and at a communications interface, a dataset comprising one or more electronic messages;

parsing, from the one or more electronic messages, sentences via natural language processing and running the parsed sentences through a machine learning model;

based on the running of the parsed sentences through the machine learning model, identifying one or more pending tasks in the dataset;

parsing, from the dataset, a plurality of identifiers;

based on the parsing of the plurality of identifiers, identifying each person who is indicated in the dataset;

for each pending task:

based at least in part on the parsing of the sentences, the running of the parsed sentences through the machine learning model, and the parsing of the plurality of identifiers, computing a confidence score for each identified person mentioned in the dataset, the confidence score indicating a level of confidence that the identified person is assigned to complete the pending task;

selecting at least one identified person to complete the pending task based on computed confidence scores;

associating the pending task with the at least one identified person selected; and storing, in computer memory, the pending task to an object associated with the at least one identified person selected.

18. The process of claim 17, further comprising: for each pending task, identifying a subset of people as potentially being people for whom the pending task is to be completed, and associating the pending task with the subset of people that are identified as potentially being people for whom the pending task is to be completed.

19. A system for identifying task assignments, comprising:

a task assignment identifier service comprising one or more computing devices, said one or more computing devices being in communication with each other via a computer network to:

receive, over a computer network and at a communications interface, a dataset comprising one or more electronic messages;

parse, from the one or more electronic messages, sentences via natural language processing and run the parsed sentences through a machine learning model;

based on the parsing and the running of the parsed sentences through a machine learning model, identify, in the one or more electronic messages, one or more pending tasks that are to be completed, none of the one or more electronic messages indicate an identity of one or more persons who are responsible for completing the task;

parse, from the data set, identifiers representing a plurality of people and run the identifiers through the machine learning model;

based on the parsing of the identifiers and running the identifiers through the machine learning model, identify each of a plurality of people who are mentioned in the dataset, and based at least in part on the identifying of the one or more pending tasks and none of the one or more electronic messages indicating an identity of the one or more persons who are responsible for completing the task, compute a confidence score for each identified person mentioned in the dataset, the confidence score indicating a level of confidence that the identified person is a person for whom the pending task is to be completed by;

select at least one identified person whose confidence score is greater than a threshold;

associate the at least one identified person as being within a subset of people for whom the pending task is to be completed; and adding the pending task to a list associated with the at least one identified person.

20. The system of claim 19, wherein the plurality of sub-programs of the computer program further configure said one or more computing devices to:

for each pending task, select one or more identified persons to assign to complete the pending task, and input the pending task to a calendar associated with each of the one or more identified persons to assign each of the one or more identified persons to complete the pending task.

* * * * *